April 18, 1933.　　　S. SANDELOWSKY　　　1,904,086

AUTOMATIC ARC WELDING

Filed March 17, 1931

Inventor:
Sally Sandelowsky,
by Charles E. Tullar
His Attorney.

Patented Apr. 18, 1933

1,904,086

UNITED STATES PATENT OFFICE

SALLY SANDELOWSKY, OF HENNIGSDORF, GERMANY, ASSIGNOR TO GENERAL ELECTRIC COMPANY, A CORPORATION OF NEW YORK

AUTOMATIC ARC WELDING

Application filed March 17, 1931, Serial No. 523,333, and in Germany March 26, 1930.

My invention relates to automatic arc welding wherein means are provided for feeding welding electrodes relatively to one another to strike and maintain a welding arc.

An object of my invention is to provide an improved system which is simple, positive, and sensitive.

It is a further object of my invention to provide a control system in which the rate of electrode feed is controlled in response to arc current and arc voltage.

Another object of my invention is to provide a system in which a single vibratory regulator controls the operation of the electrode feeding mechanism in accordance with voltage and current conditions in the welding circuit.

My invention will be better understood from the following description taken in connection with the accompanying drawing, and its scope will be pointed out in the appended claims.

Figure 1:
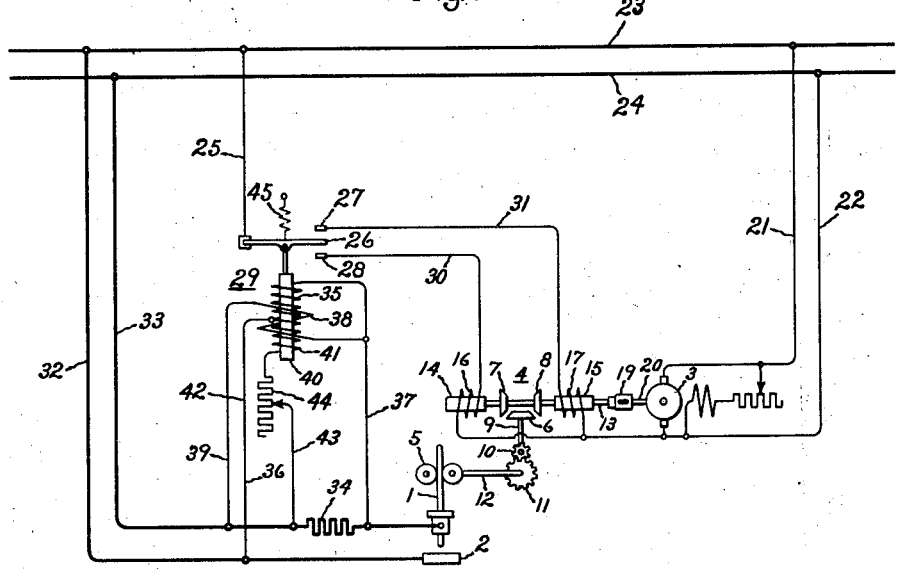
Figure 2:
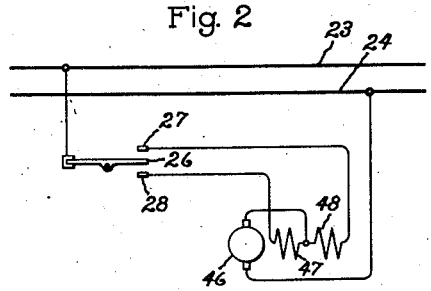

In the accompanying drawing, Fig. 1 is a diagrammatic representation of a welding system according to my invention, in which a constant-speed motor is employed to feed an electrode, the rate of electrode feed being determined by a regulating mechanism or variable speed transmission interposed between the feed motor and the feeding mechanism, and Fig. 2 is a fragmentary view of a system embodying my invention, in which a variable speed motor whose direction of rotation may also be controlled is employed for feeding the welding electrodes relatively to one another.

In the system illustrated in Fig. 1, the electrode 1 is fed toward or away from the work 2, constituting the other electrode, by a constant-speed motor 3. The rate of electrode feed is controlled by a regulating means 4 connecting the motor 3 with the electrode feed rolls 5.

The regulating means 4 comprises a driven element 6 and two driving elements 7 and 8. The driving elements are rotated in the same direction by the motor 3, and are located relatively to the driven element 6 so that when in engagement therewith one will rotate it in one direction and the other will rotate it in the other direction. Driven element 6 is connected through a shaft 9, suitable speed reduction gears 10 and 11, and a shaft 12 to the feed rolls 5. Depending on the direction of rotation given to the driven member 6 the electrode 1 will be fed toward and away from the work 2 by the feed rolls 5. The driving elements 7 and 8 of the regulating mechanism 4 are mounted on a shaft 13, on which are also mounted core or armature members 14 and 15. These cores are under the control of operating coils 16 and 17. Depending upon which coil is energized, either driving element 7 or driving element 8 will be brought into engagement with the driven element 6 by a lateral displacement of the shaft 13 through the agency of these coils acting upon the cores 14 and 15. In order to permit this lateral movement, a slip coupling 19 is provided between the shaft 13 and the shaft 20 of the feed motor.

It is apparent that the regulating means 4 just described may be variously modified in that other means may be provided for the means illustrated, it being only essential that controllable regulating means be interposed between the constant speed motor 3 and the feed rolls 5, the speed and direction of which may be changed to regulate the rate of electrode feed in accordance with conditions in the welding circuit to strike and maintain a welding arc.

The feed motor 3 is connected through conductors 21 and 22 to a substantially constant voltage supply circuit 23, 24. The coils 16 and 17 of the regulating means are likewise connected to this same source of supply through conductor 25, relatively movable contacts 26, 27, and 28 of a vibratory regulator 29, conductors 30 and 31, and conductor 22. The welding electrodes 1 and 2 are connected in a welding circuit, the voltage of which varies inversely with the current. This welding circuit is connected to the constant potential circuit 23, 24 through conductors 32 and 33, and the desired welding characteristic is imparted to the welding circuit by means of a resistance 34 interposed in this circuit between the constant voltage circuit and the welding electrodes. The desired welding characteristics may also be obtained by employing a variable voltage generator connected between the welding electrodes 1, 2 and the constant voltage supply source 23, 24. The resistor shown in Fig. 1 is often referred to as a stabilizing resistor since it gives stability to the welding arc. Although in this figure, which represents a direct current system, a resistor is shown, it is to be understood that in alternating current systems a reactance may be used in place of a resistor to accomplish the desired stabilizing effect. A stabilizing reactance, however, is sometimes used in direct current systems.

The regulator 29 is responsive to arc current and arc voltage, and controls the regulating means 4 in accordance with conditions in the welding circuit to control the rate of electrode feed during welding. It is provided with a winding 35 connected to be responsive to arc voltage through conductors 36 and 37, and a winding 38 connected to be responsive to arc current through conductors 37 and 39 which places the coil in series with the arc across the stabilizing resistance 34. The voltage and current windings 35 and 38 act differentially with respect to each other upon the core 40 of the regulator. Associated with these coils is a third coil 41, which is connected through conductors 42 and 43 through an adjustable resistor 44, to conductors 32 and 33 of the welding circuit, which are, in turn, directly connected to the substantially constant voltage circuit 23, 24. This coil 41 consequently is excited to a predetermined extent, depending upon the adjustment of the resistance 44. The adjustment of the resistance 44 is such that under short-circuit conditions, that is when the electrode 1 is in engagement with the electrode 2, the coil 41 completely neutralizes the effect of the current coil 38. This coil consequently acts differentially with respect to current coil 38, and cumulatively with respect to the voltage coil 35. Contact 26 moves between the fixed contacts 27 and 28 of the regulator in response to the resulting flux set up by the coils 35, 38, and 41. A spring 45 is provided which acts on the movable contact 26 or the core member 40 of the regulator in opposition to the magnetic effect of these coils.

The operation of the system just described is as follows:

When the welding circuit is connected to the constant potential source 23, 24 through a switch, not shown, voltage is applied to the electrodes 1 and 2, which it is assumed are not in engagement with one another. This voltage will be the full voltage of the source, and will be applied to the voltage coil 35 of the regulator 29. The current coil 38 of the regulator will under these conditions be unexcited due to the fact that no current is flowing in the welding circuit. The neutralizing coil 41, however, will be fully excited, and acting in conjunction with the voltage coil 35 will through the armature 40 operate the movable contact 26 to its lower position against the action of the spring 45, bringing contact 26 into engagement with contact 28. This will complete a circuit through the regulating means 4 as follows: from one side of the source of supply 23, through conductor 25, contacts 26 and 28, conductor 30, coil 16, and conductor 22, to the other side of the source of supply 24. This will cause the driving element 7 to be brought into engagement with the driven element 6, and the feed motor 3 will operate through the transmission thus established, and the gearings 9, 10, 11, 12, to operate the feed rolls 5 in a direction to feed the electrode 1 toward the work 2.

When the electrode 1 engages the work 2, the voltage coil 35 will be short-circuited, and thus deenergized, whereas the current coil 38 will be energized to its maximum extent by reason of the short-circuit current flowing through the welding circuit. The neutralizing winding 41, however, overcomes the effect of the coil 38, and permits the spring 45 to raise the movable contact 26 into engagement with the fixed contact 27, completing a circuit through the coil 17 with the regulating means 4, as follows: From one side of the constant potential source 23, through conductor 25, contacts 26, 27, conductor 31, coil 17, and conductor 22, to the other side of the source of supply 24. The energization of the coil 17 causes the driven element 8 to engage the driving element 6 and reverse the operation of the feeding means withdrawing electrode 1 relative to the electrode 2 to strike the welding arc. As the arc is lengthened after being struck, the voltage applied to the voltage coil 35 of the regulator increases, and due to the decrease in current in the welding circuit the excitation of the welding circuit decreases. These two coils, it will be remembered, act differentially with respect to one another. As soon as the desired arc conditions are obtained, the resultant flux of the regulator coils moves the core 40 of the regulator to the neutral position shown in the drawing. If, however, the conditions depart from those desired, the movable contact 26 rapidly vibrates between the contacts 27 and 28, thereby controlling the energization of the coils 16 and 17 to operate the regulating means 4 in a suitable manner to feed the electrode at a proper rate to maintain the desired arc conditions.

As has been pointed out above, the voltage coil 35 acts differentially with respect to the current coil 38. It has also been pointed out that in the welding circuit the voltage varies inversely with the welding current. Thus when the arc voltage increases, the excitation of the voltage coil 35 also increases, and at the same time the welding current decreases and the excitation of the current coil 38 also decreases. The differential connection of the coils 35 and 38 produces a rapid flux change in the regulator, and greatly increases the sensitivity of the regulator. It is this double differential effect in the regulator which causes this system to operate with increased sensitivity. By reason of the neutralizing coil 41 a single relay may be employed for controlling the regulating means 4, thus greatly simplifying the system. It will thus be seen that I have provided a system which is simple, positive, and extremely sensitive to conditions in the welding circuit.

The vibratory regulator shown in Fig. 1 may also be used to control the direction and rate of speed of the feed motor directly, as shown in the fragmentary diagram of Fig. 2. In this figure, only the constant potential mains 23 and 24 and the relatively movable contacts 26, 27, and 28 of the regulator 29 of Fig. 1, have been shown. A different feed motor 46, however, has been shown in this figure. It is directly connected to the electrode feed mechanism, and operates it to feed the electrode toward and away from the work to strike and maintain the welding arc. Many forms of feed motor may be used, but the form illustrated in Fig. 2 is of the split field type. As shown, the motor is provided with fields 47 and 48. When the movable contact 26 of the regulator 29 engages the fixed contact 27, motor 46 is connected to the source 23, 24 through field 48, and rotates in one direction, whereas when the movable contact 26 engages the fixed contact 28 the motor is connected to the source 23, 24 through field 47, and rotates in the reverse direction. The regulator 29, by rapidly making and breaking the control circuit at contacts 26 and 27 or contacts 26 and 28, may also function to control the speed of the motor 46 for either of these directions of rotation. It is thus apparent that the proposed system is applicable to variable speed feed motor systems as well as to systems in which a constant-speed feed motor acting through a variable speed transmission is employed for feeding the welding electrode.

While I have shown and described but two embodiments of my invention, it will be obvious to those skilled in the art that changes and modifications may be made in the systems described without departing from my invention. For example in Fig. 1 the neutralizing coil 41 may be adjusted to neutralize the effect of the voltage coil 35 when this coil is fully excited by being subjected to the full voltage of the system, as when starting the welding operation with electrodes 1 and 2 out of engagement with one another, and by reversing the direction of rotation of the feed motor 3 the system will function without departing from my invention to strike and maintain the welding arc. I therefore aim in the appended claims to cover all such changes and modifications as fall within the true spirit and scope of my invention.

What I claim as new and desire to secure by Letters Patent of the United States is:

1. An automatic arc welding system, comprising electrode feeding mechanism, a regulator having a plurality of actuating coils, one of which is connected to be responsive to arc voltage and act differentially with respect to another of said coils which is connected to be responsive to arc current, and another of which is connected to neutralize the maximum effect of one of said first mentioned coils, and means controlled by said regulator for controlling said electrode feeding mechanism.

2. An arc welding system comprising a substantially constant voltage circuit, a welding circuit the voltage of which varies inversely with the current, electrode feeding mechanism, means, including a regulator having a plurality of operating coils, for controlling said mechanism, means for connecting one of said coils across the welding electrodes, means for connecting another of said coils in series with said electrodes, and means for connecting another of said coils across said constant voltage circuit, said last mentioned coil acting differentially with respect to one of said first mentioned coils and cumulatively with respect to the other of said coils.

3. In an arc welding system, electrode feeding mechanism, means including an electric circuit for controlling said feeding mechanism and means for rapidly making and breaking said control circuit, said means having a plurality of operating coils, one of which is connected to be responsive to arc voltage, another of which is connected to be responsive to arc current and to act differentially with respect to said voltage coil, and a third of which is connected to neutralize the effect of said current coil on arc short circuit.

In witness whereof, I have hereunto set my hand.

SALLY SANDELOWSKY.